United States Patent
Streit et al.

(10) Patent No.: US 11,042,262 B2
(45) Date of Patent: Jun. 22, 2021

(54) MENU MODIFICATION BASED ON CONTROLLER MANIPULATION DATA

(71) Applicant: OpenTV, Inc., San Francisco, CA (US)

(72) Inventors: Paul Streit, San Jose, CA (US); Marc Stoksik, Palo Alto, CA (US)

(73) Assignee: OPENTV, INC., San Francisco, CA (US)

( * ) Notice: Subject to any disclaimer, the term of this patent is extended or adjusted under 35 U.S.C. 154(b) by 572 days.

(21) Appl. No.: 15/422,221

(22) Filed: Feb. 1, 2017

(65) Prior Publication Data
US 2018/0217719 A1 Aug. 2, 2018

(51) Int. Cl.
*G06F 3/0482* (2013.01)
*G06F 3/0346* (2013.01)
(Continued)

(52) U.S. Cl.
CPC .......... *G06F 3/0482* (2013.01); *G06F 3/0346* (2013.01); *G06F 3/165* (2013.01);
(Continued)

(58) Field of Classification Search
CPC .. H04N 5/4403; H04N 5/4442; H04N 5/4444; H04N 21/4222; H04N 21/42222;
(Continued)

(56) References Cited

U.S. PATENT DOCUMENTS

| | | | |
|---|---|---|---|
| 6,256,019 B1 * | 7/2001 | Allport | G07C 9/00158 283/74 |
| 7,092,926 B2 * | 8/2006 | Cerrato | G06F 21/316 706/12 |

(Continued)

FOREIGN PATENT DOCUMENTS

| | | |
|---|---|---|
| AU | 2017268643 | 8/2018 |
| CN | 101568895 | 10/2009 |

(Continued)

OTHER PUBLICATIONS

"European Application Serial No. 17201698.2, Extended European Search Report dated May 23, 2018", 8 pgs.

"Hopper Whole-Home HD DVR System User Guide", [Online]. Retrieved from the Internet: <http://www.mydish.com/filestream.ashx?ID=2658>, (2012), 138 pgs.

(Continued)

*Primary Examiner* — Kavita Stanley
*Assistant Examiner* — Phoebe X Pan
(74) *Attorney, Agent, or Firm* — Schwegman Lundberg & Woessner, P.A.

(57) ABSTRACT

A machine performs menu modification based on information that indicates how a controller device was manipulated by a user. The machine causes a media device to display a portion of a menu. The machine accesses controller manipulation data generated by a controller device in fully or partially controlling the media device, such as controller manipulation data that indicates a sequence of physical manipulations experienced by the controller device being operated by a user to select menu items. Based on the sequence of physical manipulations, the machine selects a profile identifier from a set of profile identifiers. Based on the profile identifier, the machine selects a first subset of the menu. The first subset indicates menu items to be hidden, unlike a second subset of the menu. The machine causes the media device to modify the menu by omitting the first subset while continuing to display the second subset.

20 Claims, 8 Drawing Sheets

(51) Int. Cl.
*H04N 21/422* (2011.01)
*H04N 21/441* (2011.01)
*H04N 21/431* (2011.01)
*H04N 21/258* (2011.01)
*G06F 3/16* (2006.01)
*G06F 16/2455* (2019.01)

(52) U.S. Cl.
CPC . *G06F 16/24568* (2019.01); *H04N 21/25891* (2013.01); *H04N 21/4222* (2013.01); *H04N 21/42222* (2013.01); *H04N 21/4312* (2013.01); *H04N 21/441* (2013.01)

(58) Field of Classification Search
CPC .......... G06F 3/0482; G06F 16/24568; G06F 3/0346; G06F 3/165
See application file for complete search history.

(56) References Cited

U.S. PATENT DOCUMENTS

| | | | |
|---|---|---|---|
| 9,038,109 B2 | 5/2015 | Steading et al. | |
| 9,100,708 B2 | 8/2015 | Moran et al. | |
| 9,223,297 B2* | 12/2015 | Nielsen | G05B 1/00 |
| 9,519,909 B2* | 12/2016 | Nielsen | H04H 60/45 |
| 9,577,992 B2* | 2/2017 | Zizi | H04L 9/06 |
| 9,590,986 B2* | 3/2017 | Zizi | H04L 63/0861 |
| 9,747,734 B2* | 8/2017 | Chaar | G07C 9/00071 |
| 10,127,371 B2* | 11/2018 | Asnis | G06F 3/017 |
| 10,154,316 B2* | 12/2018 | Zhao | H04N 21/485 |
| 10,262,324 B2* | 4/2019 | Turgeman | G06Q 20/4016 |
| 2002/0059094 A1* | 5/2002 | Hosea | H04N 21/25891 725/10 |
| 2005/0174324 A1* | 8/2005 | Liberty | G06F 3/017 345/156 |
| 2005/0243061 A1* | 11/2005 | Liberty | A61B 5/1171 345/158 |
| 2005/0253806 A1* | 11/2005 | Liberty | G06F 3/0383 345/156 |
| 2010/0073496 A1* | 3/2010 | Varadarajan | H04N 5/4403 348/211.99 |
| 2011/0043475 A1* | 2/2011 | Rigazio | G06F 3/04883 345/173 |
| 2011/0090407 A1 | 4/2011 | Friedman | |
| 2011/0126237 A1 | 5/2011 | Lee et al. | |
| 2013/0006898 A1* | 1/2013 | Phielipp | G06F 21/316 706/12 |
| 2013/0088648 A1 | 4/2013 | Yoon et al. | |
| 2013/0290233 A1* | 10/2013 | Ferren | G06K 9/3266 706/46 |
| 2014/0176479 A1 | 6/2014 | Wardenaar | |
| 2014/0184922 A1 | 7/2014 | Schafer et al. | |
| 2015/0178374 A1* | 6/2015 | Rabat | G06F 21/316 707/740 |
| 2016/0182950 A1* | 6/2016 | Robinson | H04N 21/4532 725/28 |
| 2016/0192019 A1 | 6/2016 | Tanaka et al. | |
| 2016/0300054 A1* | 10/2016 | Turgeman | H04L 63/08 |
| 2017/0076576 A1* | 3/2017 | Tan | G08B 21/0492 |
| 2017/0177203 A1* | 6/2017 | Davidov | G06N 20/00 |
| 2017/0213140 A1* | 7/2017 | Ross | G06N 5/045 |
| 2017/0251268 A1* | 8/2017 | Zhao | H04N 21/422 |
| 2017/0332031 A1* | 11/2017 | Park | H04N 5/4403 |

FOREIGN PATENT DOCUMENTS

| | | |
|---|---|---|
| CN | 102640510 | 8/2012 |
| CN | 103037262 | 4/2013 |
| CN | 108391175 | 8/2018 |
| EP | 2648066 | 10/2013 |
| IN | 201714041075 | 8/2018 |
| SG | 10201709504 U | 9/2018 |

OTHER PUBLICATIONS

"European Application Serial No. 17201698.2, Response Filed Jan. 10, 2019 to Extended European Search Report dated May 23, 2018", 16 pgs.

"European Application Serial No. 17201698.2, Communication pursuant to Article 94(3) EPC dated Apr. 1, 2019", 4 pgs.

"European Application Serial No. 17201698.2, Response filed Aug. 7, 2019 to Communication pursuant to Article 94(3) EPC dated Apr. 1, 2019", 12 pgs.

"European Application Serial No. 17201698.2, Communication Pursuant to Article 94(3) EPC dated May 15, 2020", 6 pgs.

"European Application Serial No. 17201698.2, Summons to Attend Oral Proceedings dated Dec. 18, 2020", 10 pgs.

"European Application Serial No. 17201698.2, Response Filed Sep. 22, 2020 to Communication Pursuant to Article 94(3) EPC dated May 15, 2020", 5 pages.

"Singapore Application Serial No. 10201709504U, Response filed Feb. 1, 2021 to Written Opinion dated Aug. 27, 2020", 16 pgs.

"Chinese Application Serial No. 201810101806.8, Office Action dated Jan. 29, 2021", with English Translation, 10 pgs.

"Chinese Application Serial No. 201810101806.8, Response filed Apr. 22, 2021 to Office Action dated Jan. 29, 2021", with English claims, 63 pages.

\* cited by examiner

MENU MODIFICATION BASED ON CONTROLLER MANIPULATION DATA

TECHNICAL FIELD

The subject matter disclosed herein generally relates to the technical field of special-purpose machines that facilitate generation and presentation of graphical user interfaces, including software-configured computerized variants of such special-purpose machines and improvements to such variants, and to the technologies by which such special-purpose machines become improved compared to other special-purpose machines that facilitate generation and presentation of graphical user interfaces. Specifically, the present disclosure addresses systems and methods to facilitate menu modification based on controller manipulation data.

BACKGROUND

A machine may be configured to interact with one or more users by causing a graphical user interface to be generated, causing the graphical user interface to be presented to the one or more users, or both. In particular, the graphical user interface may be or include a menu of items that are each separately selectable by the user. For example, at least a portion of an electronic programming guide may be included in a menu presented within a graphical user interface, such that the included portion lists various pieces of media content (e.g., streams of media content, pieces of media content, or both) available for selection by the user (e.g., for presentation by a media player device, for recording by a media storage device, or for indication in a media preference profile). In such situations, the graphical user interface may enable the user to select media content (e.g., one or more pieces of media content or streams of media content) by indicating which media content is selected or is to be selected.

BRIEF DESCRIPTION OF THE DRAWINGS

Some embodiments are illustrated by way of example and not limitation in the figures of the accompanying drawings.

DETAILED DESCRIPTION

Figure 1:
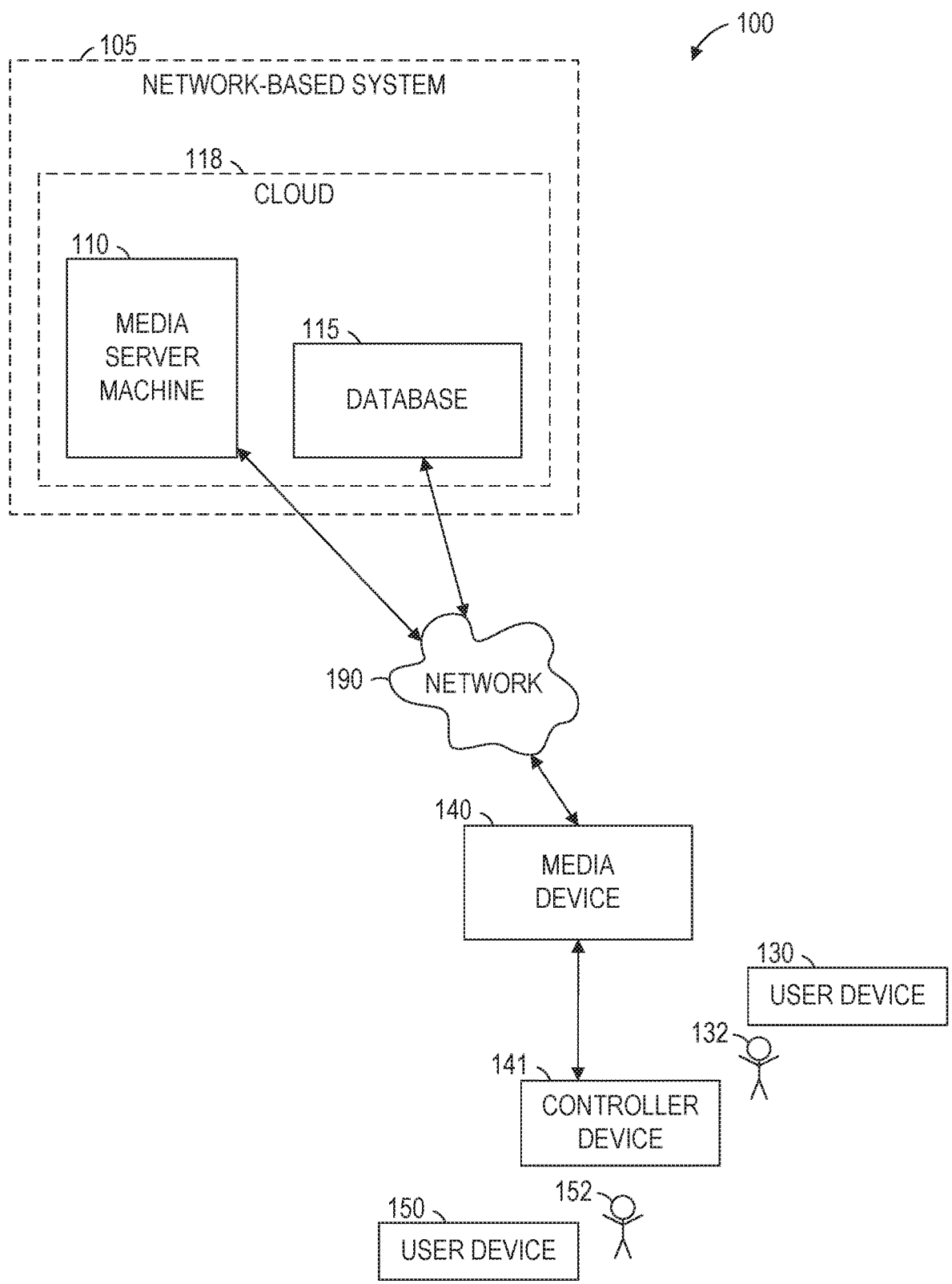
FIG. 1 is a network diagram illustrating a network environment suitable for menu modification based on controller manipulation data, according to some example embodiments.

Example methods (e.g., algorithms) facilitate menu modification based on controller manipulation data, and example systems (e.g., special-purpose machines configured by special-purpose software) are configured to facilitate menu modification based on controller manipulation data. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A machine a server machine, such as a media server machine) may be configured (e.g., by suitable hardware, software, or both) to perform menu modification (e.g., within a graphical user interface), and such menu modification may be based on manipulation data that describes, specifies, identifies, or otherwise indicates how a controller device was manipulated by a user. The machine may cause a media device (e.g., a set-top box or television set) to display at least a portion of a menu of media streams that are available to be selected (e.g., for playback by the media device). For purposes of clarity in illustrating various example embodiments, although much of the discussion herein refers to a menu of media streams (e.g., individual data streams, such as television channels or radio stations), the systems and methods discussed herein are similarly applicable to a menu of individual pieces of media content (e.g., individual movies, television show episodes, short films, advertisements, or video clips).

As configured according to the systems and methods described herein, the machine accesses (e.g., receives, retrieves, or reads) controller manipulation data that has been generated by a controller device (e.g., a remote control or a smart phone configured to function as a remote control) that fully or partially controls the media device. In particular, the controller manipulation data indicates a sequence of physical manipulations (e.g., translational or angular movements) experienced by the controller device during operation by a user in selecting one or more media streams (e.g., for playback by the media device).

Based on the indicated sequence of physical manipulations, the machine selects a profile identifier from a set of profile identifiers. For example, the selection of the profile identifier may be based on a comparison of the controller manipulation data to a controller manipulation profile that corresponds to the profile identifier (e.g., among multiple controller manipulation profiles that each correspond to a different profile identifier among multiple profile identifiers).

The machine next selects a first subset (e.g., first portion) of the menu of media streams available to be selected, and the selection of the first subset may be based on the selected profile identifier. The first subset of the menu indicates specific media streams to be hidden from view (e.g., visually omitted from the menu, from the graphical user interface, or from both). The first subset of the menu contrasts with a second subset of the menu to be preserved in view (e.g., visually maintained in the menu, in the graphical user interface, or in both). Accordingly, the selected first subset of the menu has no overlap with the second subset of the menu. The machine then causes the media device (e.g., via command or other communication) to modify the menu of media streams by omitting the first subset of the menu from the displayed portion of the menu while continuing to display the second subset of the menu in the displayed portion of the menu.

FIG. 1 is a network diagram illustrating a network environment 100 suitable for menu modification based on controller manipulation data, according to some example embodiments. The network environment 100 includes a media server machine 110, a database 115, user devices 130 and 150, a media device 140, and a controller device 141. The media server machine 110, the database 115, and the media device 140 are shown as being communicatively coupled to each other via a network 190. Additionally, the controller device 141 is communicatively coupled to the media device 140 (e.g., via the network 190 or via a different network or communication path, such as infrared signaling or other wireless signaling). Moreover, the user devices 130 and 150 may each be communicatively coupled to the controller device 141, the media device 140, or both (e.g., via the network 190 or via a different network or communication path, such as infrared signaling or other wireless signaling).

The media server machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the user devices 130 and 150). The media server machine 110, the database 115, the media device 140, the controller device 141, and the user devices 130 and 150 may each be implemented in a special-purpose (e.g., specialized) computer system, in whole or in part, as described below with respect to FIG. 8.

Also shown in FIG. 1 are users 132 and 152. One or both of the users 132 and 152 may be a human user (e.g., a human being), a machine user (e.g., a computer configured by a software program to interact with the user device 130 or the user device 150), or any suitable combination thereof (e.g., a human assisted by a machine or a machine supervised by a human). The user 132 is associated with the user device 130 and may be a user of the user device 130. For example, the user device 130 may be a desktop computer, a vehicle computer, a tablet computer, a navigational device, a portable media device, a smart phone, or a wearable device (e.g., a smart watch, smart glasses, smart clothing, or smart jewelry) belonging to the user 132. Likewise, the user 152 is associated with the user device 150 and may be a user of the user device 150. As an example, the user device 150 may be a desktop computer, a vehicle computer, a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 8, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

Figure 2:
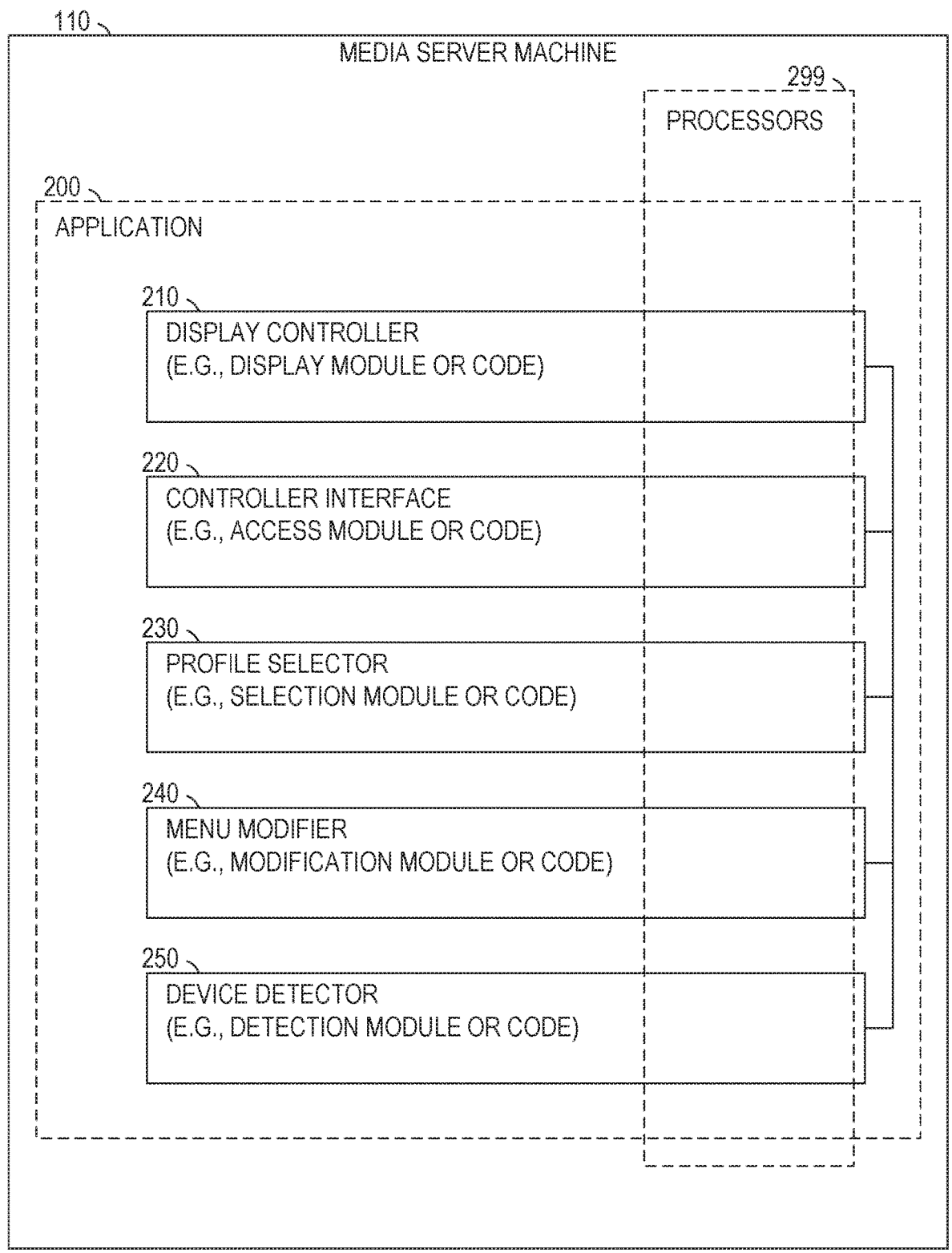
FIG. 2 is a block diagram illustrating components of a media server machine suitable for menu modification based on controller manipulation data, according to some example embodiments.

The network 190 may be any network that enables communication between or among systems, machines, databases, and devices (e.g., between the media server machine 110 and the media device 140). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software, FIG. 2 is a block diagram illustrating components of the media server machine 110, according to some example embodiments (e.g., server-side implementations). The media server machine 110 is shown as including a display controller 210, a controller interface 220, a profile selector 230, a menu modifier 240, and a device detector 250, all configured to communicate with each other (e.g., via a bus, shared memory, or a switch). The display controller 210 may be or include a display module or other code for controlling a display (e.g., by controlling the media device 140 or by controlling a display screen within or communicatively coupled to the media device 140). The controller interface 220 may be or include an access module or other code for accessing one or more controller devices (e.g., the controller device 141 or another remote control device). The profile selector 230 may be or include a selection module or other code for selecting a profile. The menu modifier 240 may be or include a modification module or other code for modifying a menu (e.g., within a graphical user interface). The device detector 250 may be or include a detection module or other code for detecting one or more devices (e.g., user devices 130 and 150).

As shown in FIG. 2, the display controller 210, the controller interface 220, the profile selector 230, the menu modifier 240, the device detector 250, or any suitable combination thereof may form all or part of an application 200 (e.g., a server-side software application) that is stored (e.g., installed) on the media server machine 110 (e.g., responsive to or otherwise as a result of data being received from the database 115, the media device 140, the controller device 141, the user device 130, the user device 150, or another data repository). Furthermore, one or more processors 299 (e.g., hardware processors, digital processors, or any suitable combination thereof) may be included (e.g., temporarily or permanently) in the application 200, the display controller 210, the controller interface 220, the profile selector 230, the menu modifier 240, the device detector 250, or any suitable combination thereof.

Figure 3:
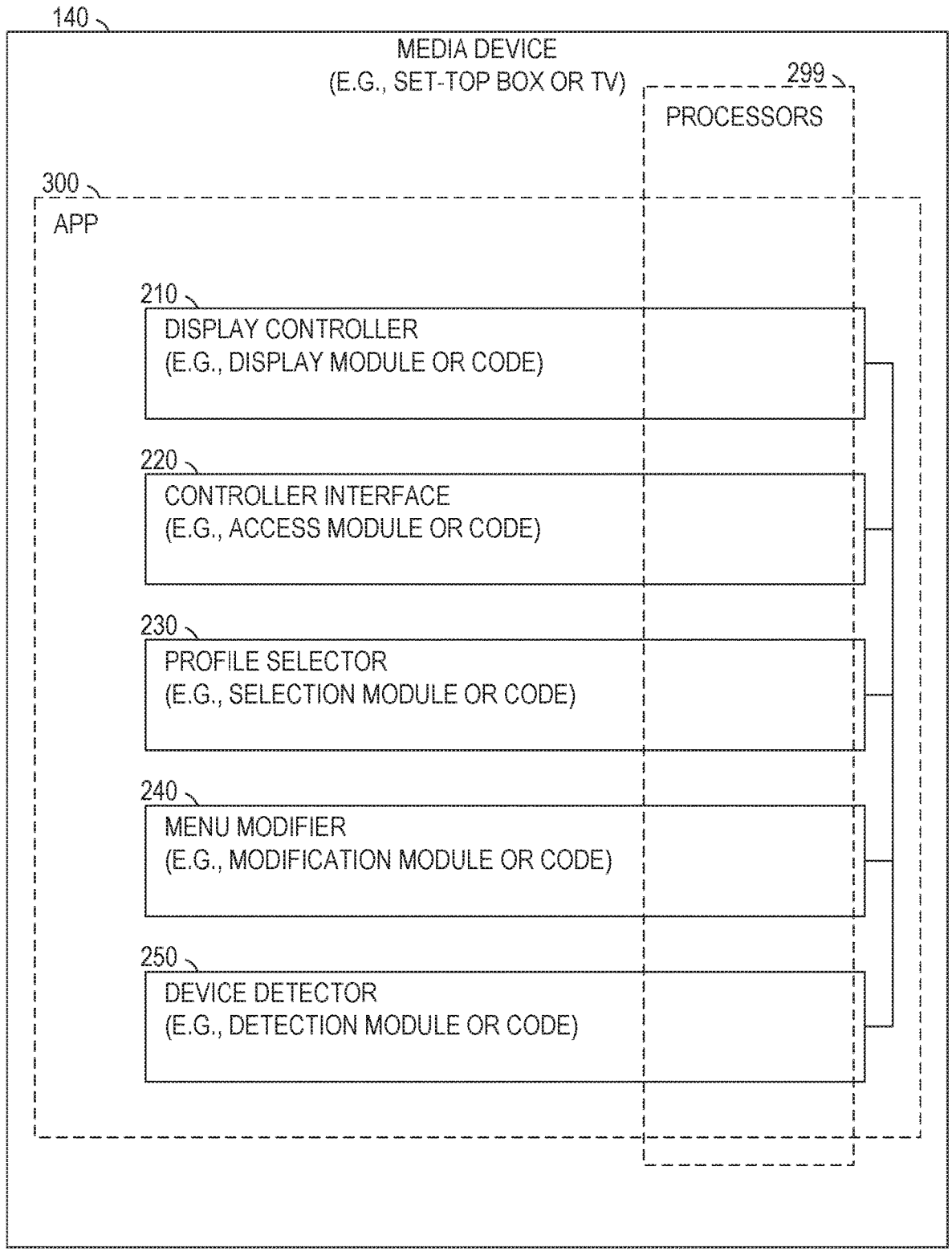
FIG. 3 is a block diagram illustrating components of a media device in the network environment, according to some example embodiments.

FIG. 3 is a block diagram illustrating components of the media device 140, according to some example embodiments (e.g., client-side implementations) The media device 140 is shown as including the display controller 210 (e.g., an instance thereof), the controller interface 220 (e.g., an instance thereof), the profile selector 230 (e.g., an instance thereof), the menu modifier 240 (e.g., an instance thereof), and the device detector 250 (e.g., an instance thereof), all configured to communicate with each other (e.g., via a bus, shared memory, or a switch). As noted above, the display controller 210 may be or include a display module or other code for controlling a display (e.g., by controlling a display screen within or communicatively coupled to the media device 140). The controller interface 220 may be or include an access module or other code for accessing one or more controller devices (e.g., the controller device 141). The profile selector 230 may be or include a selection module or other code for selecting a profile. The menu modifier 240 may be or include a modification module or other code for modifying a menu (e.g., within a graphical user interface presented by the media device 140 or a display screen thereof). The device detector 250 may be or include a detection module or other code for detecting one or more devices (e.g., user devices 130 and 150).

As shown in FIG. 3, the display controller 210, the controller interface 220, the profile selector 230, the menu modifier 240, the device detector 250, or any suitable combination thereof, may form all or part of an app 300 (e.g., a mobile app or other client-side app) that is stored (e.g., installed) on the media device 140 (e.g., responsive to or otherwise as a result of data being received from the media server machine 110, the database 115, the controller device 141, the user device 130, the user device 150, or another data repository). Furthermore, one or more processors 299 (e.g., hardware processors, digital processors, or any suitable combination thereof) may be included (e.g., temporarily or permanently) in the app 300, the display controller 210, the controller interface 220, the profile selector 230, the menu modifier 240, the device detector 250, or any suitable combination thereof. Although FIG. 2 and FIG. 3 depict the display controller 210, the controller interface 220, the profile selector 230, the menu modifier 240, and the device detector 250 as being included together on a single machine (e.g., executing on the media server machine 110 or executing on the media device 140), such components may be distributed between the media server machine 110 and the media device 140, according to various hybrid example embodiments.

Figure 4:
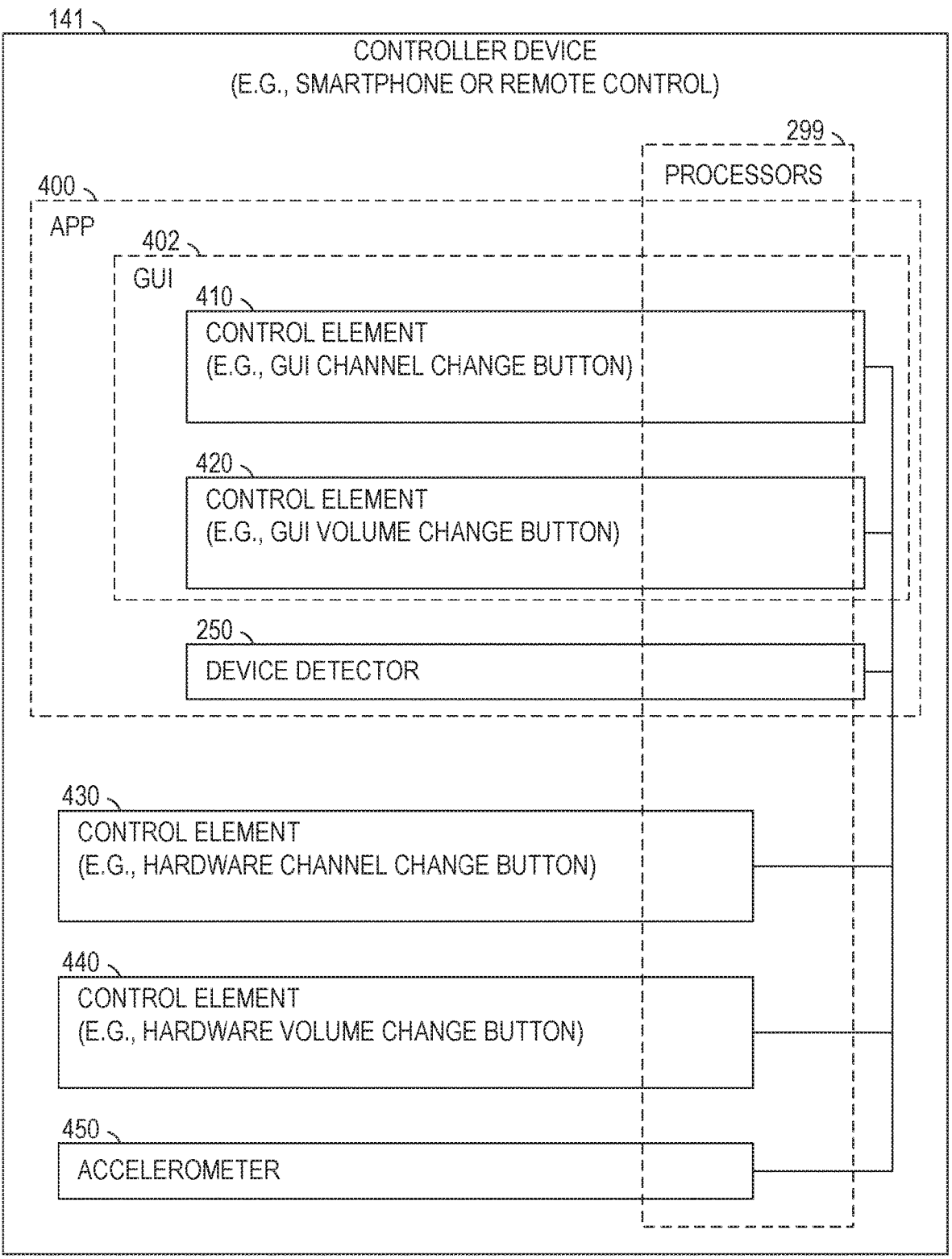
FIG. 4 is a block diagram illustrating components of a controller device suitable for menu modification based on controller manipulation data, according to some example embodiments.

FIG. 4 is a block diagram illustrating components of the controller device 141, according to some example embodiments. The controller device 141 is shown as including control elements 410, 420, 430, and 440, as well as an accelerometer 450 and the device detector 250 (e.g., an instance thereof). The control elements 410, 420, 430, and 440 each may be or include an activatable control (e.g., a software or hardware button, switch, slider, dial, knob, or other manipulable user interface element) that can be operated by a user (e.g., the user 132 or 152). For example, the control element 410 may be a graphical channel change button (e.g., channel up button or channel down button) within a graphical user interface 402; the control element 420 may be a graphical volume change button (e.g., volume up button or volume down button) within the graphical user interface 402; the control element 430 may be a hardware channel change button (e.g., channel up button or channel down button) on the exterior of the controller device 141; and the control element 440 may be a hardware volume change button (e.g., volume up button or volume down button) on the exterior of the controller device 141.

As shown in FIG. 4, the control element 410, the control element 420, or both, may form all or part of the graphical user interface 402. Moreover, the control element 410, the control element 420, the device detector 250, or any suitable combination thereof may form all or part of an app 400 (e.g., a mobile app or other client-side app) that is stored (e.g., installed) on the controller device 141 in response to or otherwise as a result of data being received from the media server machine 110, the database 115, the media device 140, the user device 130, the user device 150, or another data repository). The accelerometer 450 may be or include a set of acceleration sensors (e.g., one or more hardware accelerometers).

Any one or more of the components (e.g., modules) described herein (e.g., with respect to any of FIGS. 2-4) may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 5:
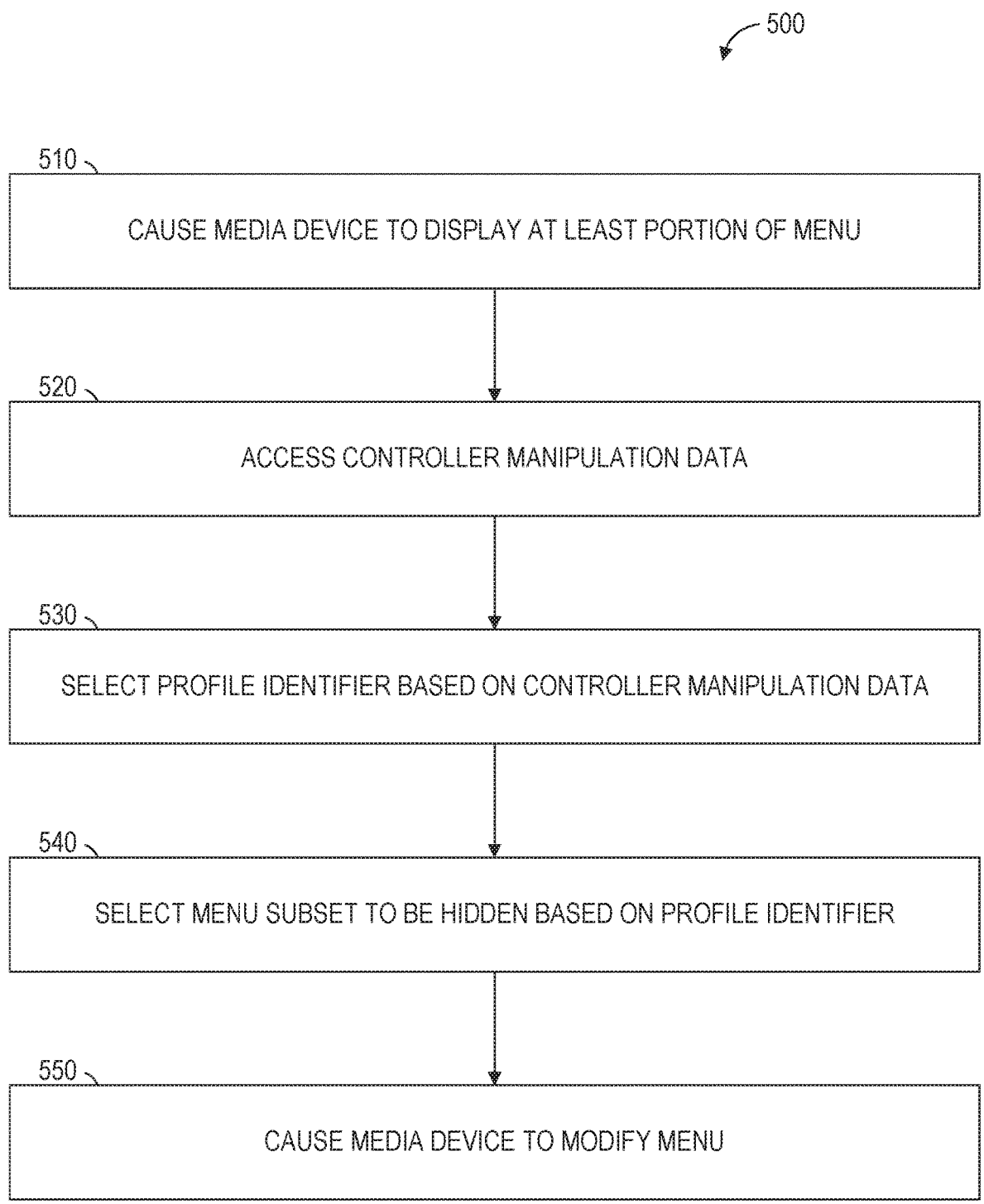
FIGS. 5-7 are flowcharts illustrating operations in a method of menu modification based on controller manipulation data, according to some example embodiments.
Figure 6:
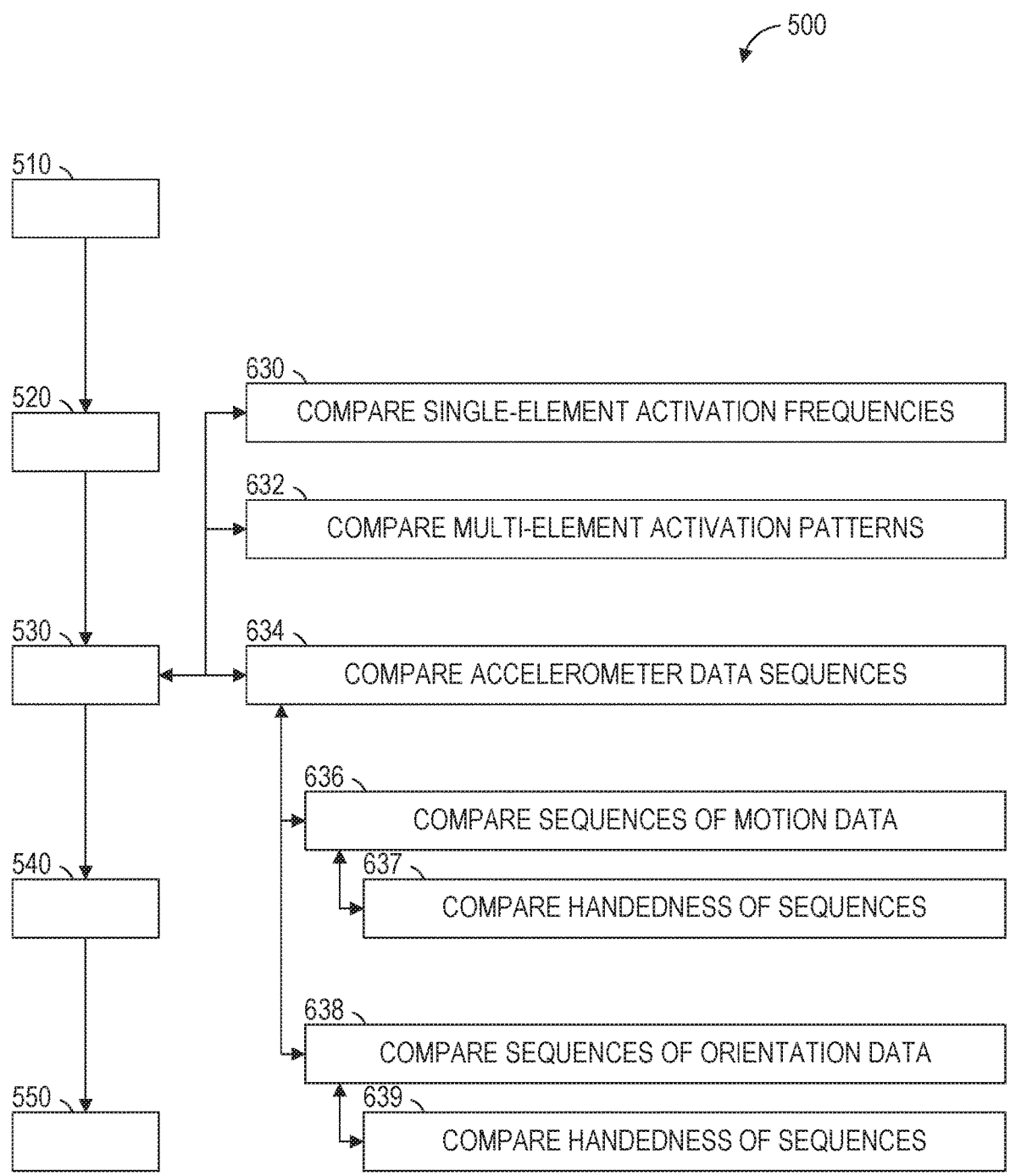
Figure 7:
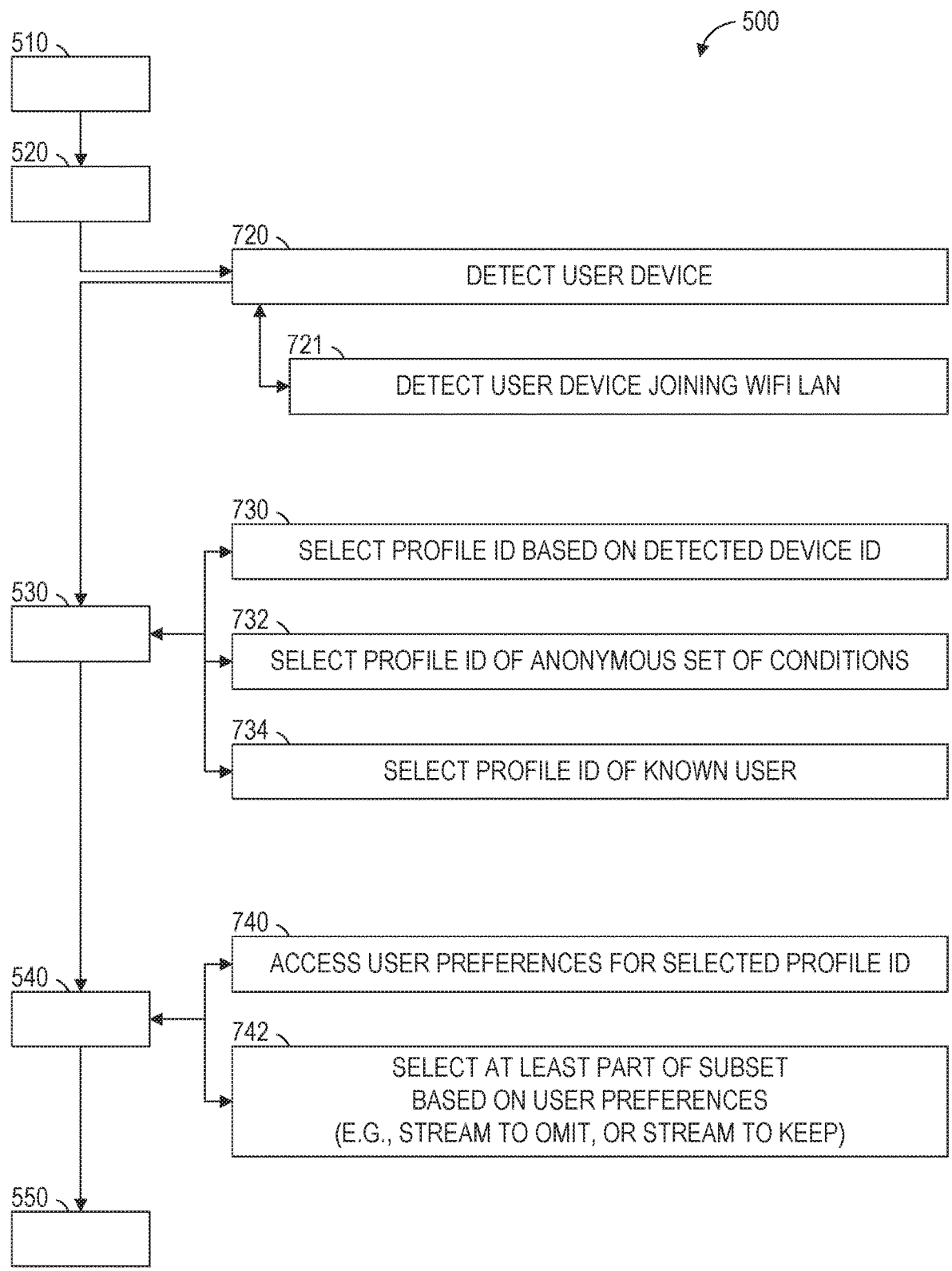

FIGS. 5-7 are flowcharts illustrating operations in a method 500 of menu modification based on controller manipulation data, according to some example embodiments. Operations in the method 500 may be performed by the media server machine 110, the media device 140, or any suitable combination thereof, using components (e.g., modules) described above (e.g., with respect to at least FIGS. 2 and 3), using one or more processors (e.g., microprocessors or other hardware processors), or using any suitable combination thereof. As shown in FIG. 5, the method 500 includes operations 510, 520, 530, 540, and 550.

In operation 510, the display controller 210 causes the media device 140 to display at least a portion of a menu of menu items (e.g., within a graphical user interface presented on a display screen fully or partially controlled by the media device 140). For example, the media device 140 may be caused to display a menu of media streams that are each individually selectable (e.g., for playback by the media device 140).

In operation 520, the controller interface 220 accesses controller manipulation data generated by the controller device 141. The controller manipulation data may be stored by the controller device 141 itself, the database 115, the media server machine 110, or any suitable combination thereof, and accessed therefrom. The controller manipulation data indicates a sequence of multiple physical manipulations (e.g., translational or angular movements) experienced by the controller device 141 during operation of the controller device 141 (e.g., in selecting one or more menu items, such as media streams selected for playback by the media device 140).

In operation 530, the profile selector 230 selects (e.g., indicates, designates, specifies, or otherwise denotes as being selected) a profile identifier from a set of profile identifiers. The set of profile identifiers may be stored by the controller device 141, the database 115, the media server machine 110, the media device 140, or any suitable combination thereof, and accessed therefrom. The profile selector 230 may therefore access the set of profile identifiers and accordingly select a profile identifier from among them. The selection of the profile identifier may be based on one or more comparisons of the controller manipulation data accessed in operation 520 to one or more controller manipulation profiles. In particular, the profile identifier may be selected based on a comparison of the controller manipulation data accessed in operation 520 to a controller manipulation profile (e.g., a reference controller manipulation profile) that corresponds to the profile identifier ultimately selected.

In operation 540, the menu modifier 240 selects a first subset of the menu of menu items (e.g., the menu of media streams), and the selection of the first subset may be based on the profile identifier selected in operation 530. As noted above, the selected first subset indicates menu items (e.g., media streams) to be hidden from view (e.g., omitted from presentation by the media device 140). Furthermore, as also noted above, the selected first subset has no overlap with a second subset of the menu of menu items, since the second subset is to be preserved in view (e.g., by continuing to be presented by the media device 140).

In operation 550, the display controller 210 causes the media device 140 to modify the presented menu of menu items (e.g., the menu of media streams) by omitting the first subset of the menu (e.g., as selected in operation 540). In tandem with this omission, the display controller 210 causes the media device 140 to continue displaying the second subset of the menu, which second subset has no overlap with the first subset. Thus, the menu becomes modified by omission of the first subset while continuing to display the second subset in the displayed portion of the menu.

As shown in FIG. 6, in addition to any one or more of the operations previously described, the method 500 may include one or more of operations 630, 632, 634, 636, 637, 638, and 639, according to various example embodiments. Any one or more of operations 630, 632, 634, 636, 637, 638, and 639 may be performed as part (e.g., a precursor task, a subroutine, or a portion) of operation 530, in which the profile selector 230 selects the profile identifier based on the controller manipulation data.

In example embodiments that include operation 630, the controller manipulation data includes one or more frequencies of activation for one or more individual control elements (e.g., control element 410, 420, 430, or 440). That is, the controller manipulation data may include a first activation frequency at which a first control element (e.g., control element 410) of the controller device 141 was activated during a sequence of activations of that first control element (e.g., repeated mashing of a channel change button or a volume change button). Accordingly, in operation 630, the profile selector 230 compares a recorded (e.g., first) activation frequency of a single control element (e.g., control element 410, as recorded in the controller manipulation data) to a reference (e.g., second) activation frequency for the same single control element (e.g., control element 410, as represented in a controller manipulation profile).

In example embodiments that include operation 632, the controller manipulation data includes patterns of activation for multiple control elements (e.g., control elements 410, 420, and 410 again, in that order). That is, the controller manipulation data may include a first activation pattern (e.g., control element 410, then control element 420, and then control element 410 again) according to which multiple control elements (e.g., control elements 410 and 420) were activated during operation of those control elements in accordance with the first activation pattern. Accordingly, in operation 632, the profile selector 230 compares a recorded (e.g., first) activation pattern of these control elements (e.g., control elements 410 and 420, as recorded in the controller manipulation data) to a reference (e.g., second) activation pattern for the same control elements (e.g., control elements 410 and 420, as represented in a controller manipulation profile).

In example embodiments that include operation 634, the controller manipulation data includes accelerometer data that indicates a series of accelerations experienced by the controller device 141. That is, the controller manipulation data may include a first sequence of accelerometer data (e.g., generated by the accelerometer 450) that indicates sequential accelerations experienced by the controller device 141 during operation of the controller device 141 (e.g., during activations of one or more control elements, such as the control element 410, either singly or in combination with other control elements, such as the control element 420). Accordingly, in operation 634, the profile selector 230 compares a recorded (e.g., first) sequence of accelerometer data (e.g., as recorded in the controller manipulation data) to a reference (e.g., second) sequence of accelerometer data (e.g., as represented in a controller manipulation profile).

For example, the recorded sequence of accelerometer data may indicate a series of movements in which the controller device 141 moves in an upward rising rightward arc (e.g., as a result of being raised to point at the media device 140 by a right-handed user) and then tilts forward slightly (e.g., 2-5 degrees as a result of the control element 410 being activated), and the reference sequence of accelerometer data may indicate a similar upward rising rightward arc followed by a similarly slight forward tilt. As another example, the recorded sequence of accelerometer data may indicate a series of movements in which the control device 141 moves in a descending rightward diagonal path with a 10-degree clockwise twist (e.g., as a result of being lowered to point at the media device 140 by a left-handed user), and the reference sequence of accelerometer data may indicate a similar descending rightward diagonal path with a similar (e.g., 8-degree) clockwise twist.

As shown in FIG. 6, one or more of operations 636, 637, 638, and 639 may be performed as part of operation 634, in which the profile selector 230 compares the recorded sequence of accelerometer data to the reference sequence of accelerometer data. In operation 636, the profile selector 230 compares a recorded sequence of motion data to a reference sequence of motion data, where each recorded or reference sequence represents translational motions of the controller device 141 (e.g., movements from one three-dimensional spatial location to another three-dimensional spatial location, such as upward movements, downward movements, leftward movements, rightward movements, forward movements, backward movements, or any suitable combination thereof).

Operation 637 may be performed as part of operation 636. In operation 637, the profile selector 230 compares a handedness of the recorded sequence with a handedness of the reference sequence. For example, the recorded sequence may indicate that the user (e.g., user 132) who manipulated the controller device 141 during the recorded sequence used his or her right hand or otherwise is inferred to be a right-handed user (e.g., based on the translational motions of the controller device 141, as indicated by the recorded sequence of accelerometer data); the reference sequence may indicate that the user (e.g., user 132 or 152) who manipulated the controller device 141 during the reference sequence used his or her right hand or otherwise is inferred to be a right-handed user (e.g., based on the translational motions of the controller device 141, as indicated by the reference sequence of accelerometer data); and the profile selector 230 may compare the right-handedness of the recorded sequence to the right-handedness of the reference sequence. As another example, if the reference sequence indicates that the user (e.g., user 152) who manipulated the controller device 141 during the reference sequence used his or her left hand or otherwise is inferred to be a left-handed user, the profile selector 230 may compare the right-handedness of the recorded sequence to the left-handedness of the reference sequence.

In some example embodiments, the handedness of the reference sequence of motion data is known from previous user input (e.g., a user preference or other user profile information corresponding to the user 132 or 152). Accordingly, the comparison of the handedness of the recorded sequence of motion data to the handedness of the reference sequence of motion data enables the handedness of the recorded sequence to be inferred from the degree to which the handedness of the recorded sequence is similar to, or different from, the handedness of the reference sequence.

In operation 638, the profile selector 230 compares a recorded sequence of orientation data to a reference sequence of orientation data, where each recorded or reference sequence represents rotational motions of the controller device 141 (e.g., movements from one angular orientation to another angular orientation, such as upward pitch, downward pitch, leftward yaw, rightward yaw, leftward roll, rightward roll, or any suitable combination thereof).

Operation 639 may be performed as part of operation 638. In operation 639, the profile selector 230 compares a handedness of the recorded sequence with a handedness of the reference sequence. For example, the recorded sequence may indicate that the user (e.g., user 132) who manipulated the controller device 141 during the recorded sequence used his or her right hand or otherwise is inferred to be a right-handed user (e.g., based on the rotational motions of the controller device 141, as indicated by the recorded sequence of accelerometer data); the reference sequence may indicate that the user (e.g., user 132 or 152) who manipulated the controller device 141 during the reference sequence used his or her right hand or otherwise is inferred to be a right-handed user (e.g., based on the rotational motions of the controller device 141, as indicated by the reference sequence of accelerometer data); and the profile selector 230 may compare the right-handedness of the recorded sequence to the right-handedness of the reference sequence. As another example, if the reference sequence indicates that the user (e.g., user 152) who manipulated the controller device 141 during the reference sequence used his or her left hand or otherwise is inferred to be a left-handed user, the profile selector 230 may compare the right-handedness of the recorded sequence to the left-handedness of the reference sequence.

In some example embodiments, the handedness of the reference sequence of orientation data is known from previous user input (e.g., a user preference or other user profile information corresponding to the user 132 or 152). Accordingly, the comparison of the handedness of the recorded sequence of orientation data to the handedness of the reference sequence of orientation data enables the handedness of the recorded sequence to be inferred from the degree to which the handedness of the recorded sequence is similar to, or different from, the handedness of the reference sequence.

As shown in FIG. 7, in addition to any one or more of the operations previously described, the method 500 may include one or more of operations 720, 721, 730, 732, 734, 740, and 742, according to various example embodiments. Operations 720 and 730 may be implemented in the example embodiments that support a device detection feature, in which detection of a nearby device (e.g., user device 130 or user device 150) forms a basis for the profile selector 230 in operation 530 to select the profile identifier based on the controller manipulation data.

In operation 720, the device detector 250 detects that a user device (e.g., the user device 130 that corresponds to the user 132) is near the media device 140 (e.g., in physical proximity to the media device 140 in comparison to a threshold distance, such as the user device 130 being able to wirelessly communicate with the media device 140 with a minimum threshold signal strength), near the controller device 141 (e.g., in physical proximity to the controller device 141 in comparison to a threshold distance, such as the user device 130 being able to wirelessly communicate with the controller device 141 with a minimum threshold signal strength), or any suitable combination thereof. The detected nearness of the user device e.g., user device 130) to the media device 140, the controller device 141, or both, may be a basis for inferring that the corresponding user (e.g., user 132) is the user who is manipulating the controller device 141. Accordingly, the device detector 250 may provide the results of this detection as input to the profile selector 230 to aid in the performance of operation 530, in which the profile identifier is selected by the profile selector 230.

Operation 721 may be performed as part (e.g., a precursor task, a subroutine, or a portion) of operation 720. In operation 721, as part of detecting the user device (e.g., user device 130), the device detector 250 detects that the user device is joining a wireless network (e.g., a Wi-Fi local area network or a Bluetooth personal area network) that the controller device 141 has also joined. Accordingly, the device detector 250 may provide the results of this detection as input to the profile selector 230, as discussed above.

In example embodiments that include operation 720, operation 730 may be performed as part (e.g., a precursor task, a subroutine, or a portion) of operation 530, in which the profile selector 230 selects the profile identifier based on the controller manipulation data. As noted above, if the device detector 250 has detected (e.g., in operation 720) that the user device (e.g., user device 130) is near the controller device 141, the result of this detection may be communicated by the device detector 250 to the profile selector 230 and may cause the profile selector 230 to select the profile identifier (e.g., of a known user, such as the user 132) based on the detected user device. In some example embodiments, the result of this detection may be or include a device identifier (e.g., a name of the device, a network address of the device, or any suitable combination thereof). Accordingly, in operation 730, the profile identifier is selected based on such a device identifier (e.g., communicated by the device detector 250 to the profile selector 230). For example, the profile selector 230 may select a profile identifier that corresponds to the user (e.g., user 132) who corresponds to the detected user device (e.g., user device 130) by virtue of corresponding to a device identifier thereof (e.g., a device name or network address that identifies the user device 130.

According to some example embodiments, the performance of operation 530 by the profile selector 230 results in selection of an anonymous profile identifier that corresponds to an anonymous set of conditions (e.g., indicated by or inferred from the controller manipulation data), that is, a set of conditions that are not linked or associated with any known user (e.g., user 132). For example, the user 152 may be physically manipulating the controller device 141 for the very first time; and the corresponding set of conditions may be treated as an anonymous user profile that is identified by an anonymous profile identifier. Accordingly, the profile selector 230 may perform operation 732 by selecting a profile identifier that corresponds to a specific, but anonymous, set of conditions. As an example, the profile selector 230 may generate or otherwise obtain a new profile identifier, a new user profile, or both. In some example embodiments, the profile selector 230 may select or otherwise apply a default template in generating or otherwise obtaining a new profile identifier, a new user profile, or both. According to various example embodiments, multiple anonymous profiles (e.g., in the form of multiple, yet distinct, anonymous sets of conditions) may be supported and differentiated by the profile selector 230.

As mentioned above, according to some alternative example embodiments, the performance of operation 530 by the profile selector 230 results in selection of a known profile identifier, that is, a profile identifier that corresponds to a known, previously profiled, or otherwise non-anonymous user (e.g., user 132). For example, a set of one or more pre-existing profile identifiers (e.g., with or without corresponding pre-existing user profiles) may be stored by the media server machine 110, the database 115, the media device 140, the controller device 141, a user device that was detected in operation 720 (e.g., user device 130), or any suitable combination thereof, and the profile selector 230 may accordingly perform operation 734 by selecting one of these pre-existing profile identifiers (e.g., with or without selecting a corresponding pre-existing user profile).

One or both of operations 740 and 742 may be performed as part of operation 540, in which the menu modifier 240 selects the first subset of the menu of menu items (e.g., the menu of media streams), which selection may be based on the profile identifier selected in operation 530. In operation 740, the menu modifier 240 accesses user preferences for the selected profile identifier. Such user preferences may be stored in a user profile, which may be included in a set of one or more pre-existing user profiles that are stored or otherwise made available by the media server machine 110, the database 115, the media device 140, the controller device 141, a user device that was detected in operation 720 (e.g., user device 130), or any suitable combination thereof.

In operation 742, the user preferences accessed in operation 740 are used as a basis for selecting the first subset of the menu, in accordance with operation 540. Accordingly, in operation 742, the menu modifier 240 selects at least part of the first subset based on the user preferences. For example, the user preferences may list, identify, specify, or otherwise indicate one or more menu items to omit (e.g., media streams to omit from view), one or more menu items to preserve (e.g., media streams to maintain in view), or any suitable combination thereof.

Thus, the menu of menu items (e.g., the menu of media streams) can be modified by the menu modifier 240 in accordance with user preferences that correspond to a profile identifier that was selected based on the controller manipulation data accessed in operation 520. As noted above, such a modified menu can be presented or caused to be presented by the media device 140. This may have the effect of customizing, personalizing, or otherwise targeting the modification of the menu of menu items specifically for a user user 132 or 152) without necessarily making an affirmative identification of the user. That is, the controller manipulation data can be sufficient to distinguish, disambiguate, or otherwise indicate different human users of the controller device 141, whether the human users are known or unknown (e.g., anonymous) to the media server machine 110, the database 115, the media device 140, the controller device 141, or any suitable combination thereof.

According to various example embodiments, one or more of the methodologies described herein may facilitate menu modification based on controller manipulation data. Moreover, one or more of the methodologies described herein may facilitate modifying a menu of menu items in accordance with one or more user preferences that correspond to a profile identifier selected based on such controller manipulation data. Hence, one or more of the methodologies described herein may facilitate customization, personalization, or other targeting of menu modifications, as well as improved experiences with a graphical user interface that contains a menu modified according to the systems and methods described herein, compared to capabilities of pre-existing systems and methods.

When these effects are considered in aggregate, one or more of the methodologies described herein may obviate a need for certain efforts or resources that otherwise would be involved in menu modification. Efforts expended by a user (e.g., user 132 or 152) in customizing or personalizing a menu of menu items may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 8:
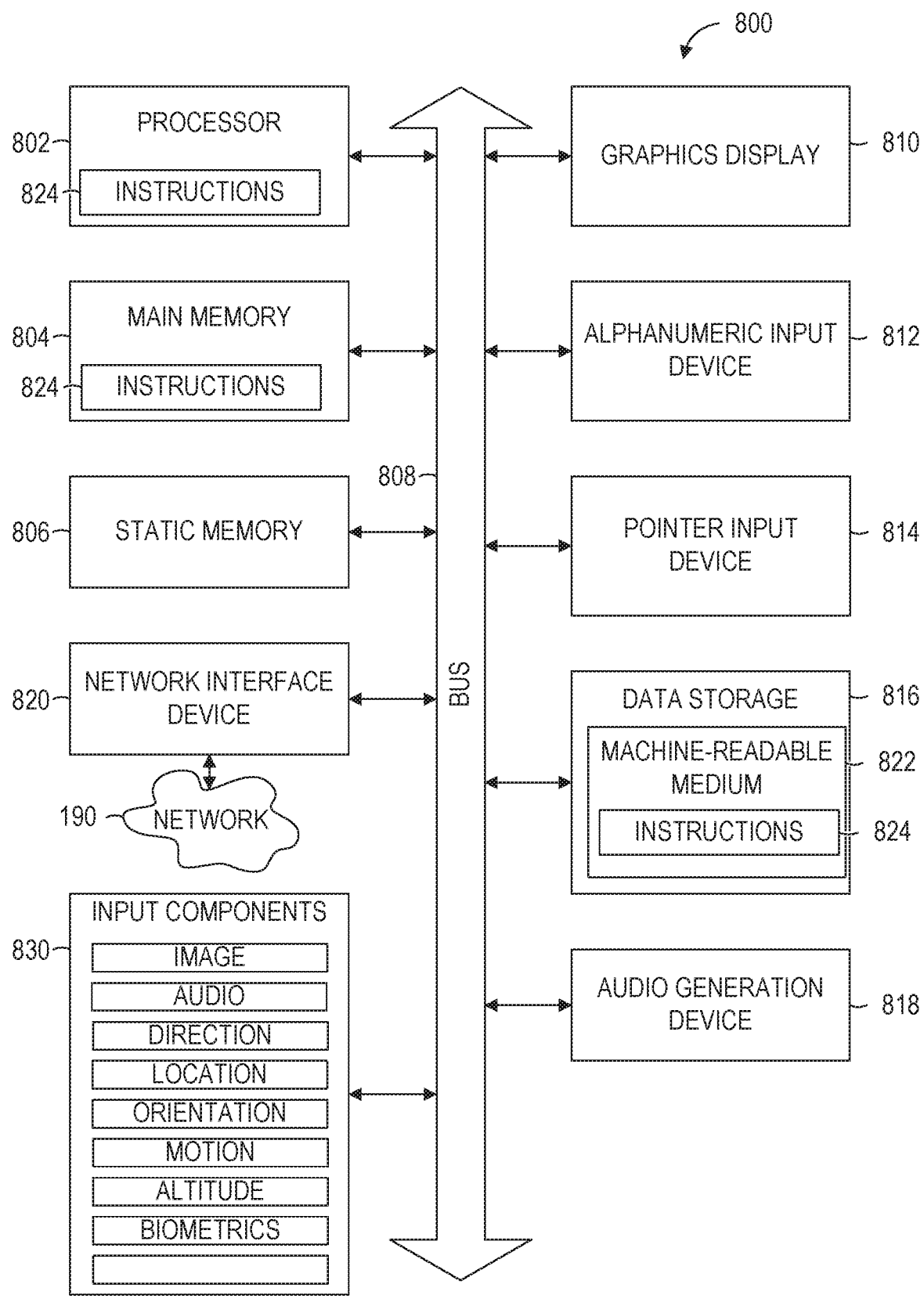
FIG. 8 is a block diagram illustrating components of a machine, according to some example embodiments, able to read instructions from a machine-readable medium and perform any one or more of the methodologies discussed herein.

FIG. 8 is a block diagram illustrating components of a machine 800, according to some example embodiments, able to read instructions 824 from a machine-readable medium 822 (e.g., a non-transitory machine-readable medium, a machine-readable storage medium, a computer-readable storage medium, or any suitable combination thereof) and perform any one or more of the methodologies discussed herein, in whole or in part. Specifically, FIG. 8 shows the machine 800 in the example form of a computer system (e.g., a computer) within which the instructions 824 (e.g., software, a program, an application, an applet, an app, or other executable code) for causing the machine 800 to perform any one or more of the methodologies discussed herein may be executed, in whole or in part.

In alternative embodiments, the machine 800 operates as a standalone device or may be communicatively coupled (e.g., networked) to other machines. In a networked deployment, the machine 800 may operate in the capacity of a server machine or a client machine in a server-client network environment, or as a peer machine in a distributed (e.g., peer-to-peer) network environment. The machine 800 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include any collection of machines that individually or jointly execute the instructions 824 to perform all or part of any one or more of the methodologies discussed herein.

The machine 800 includes a processor 802. (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 804, and a static memory 806, which are configured to communicate with each other via a bus 808. The processor 802 contains solid-state digital microcircuits (e.g., electronic, optical, or both) that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein. In some example embodiments, the processor 802 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 800 with at least the processor 802, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 800 may further include a graphics display 810 (e.g., a plasma display panel (PDP), a light emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a pointer input device 814 (e.g., a mouse, a touchpad, a touchscreen, a trackball, a joystick, a stylus, a motion sensor, an eye tracking device, a data glove, or other pointing instrument), a data storage 816, an audio generation device 818 (e.g., a sound card, an amplifier, a speaker, a headphone jack, or any suitable combination thereof), and a network interface device 820.

The data storage 816 (e.g., a data storage device) includes the machine-readable medium 822 (e.g., a tangible and non-transitory machine-readable storage medium) on which are stored the instructions 824 embodying any one or more of the methodologies or functions described herein. The instructions 824 may also reside, completely or at least partially, within the main memory 804, within the static memory 806, within the processor 802 (e.g., within the processor's cache memory), or any suitable combination thereof, before or during execution thereof by the machine 800. Accordingly, the main memory 804, the static memory 806, and the processor 802 may be considered machine-readable media (e.g., tangible and non-transitory machine-readable media). The instructions 824 may be transmitted or received over the network 190 via the network interface device 820. For example, the network interface device 820 may communicate the instructions 824 using any one or more transfer protocols (e.g., hypertext transfer protocol (HTTP)).

In some example embodiments, the machine 800 may be a portable computing device (e.g., a smart phone, a tablet computer, or a wearable device), and may have one or more additional input components 830 (e.g., sensors or gauges). Examples of such input components 830 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a biometric input component (e.g., a heartrate detector or a blood pressure detector). Input data gathered by any one or more of these input components may be accessible and available for use by any of the modules described herein.

As used herein, the term "memory" refers to a machine-readable medium able store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 824 for execution by the machine 800, such that the instructions 824, when executed by one or more processors of the machine 800 (e.g., processor 802), cause the machine 800 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 824 for execution by the machine 800 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 824).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., machines, devices, or other apparatus) discussed herein.

A first embodiment provides a method comprising:

causing, by one or more processors of a machine, a media device to display at least a portion of a menu of media streams that are selectable for playback by the media device;

accessing, by one or more processors of the machine, controller manipulation data generated by a controller device and indicating a sequence of physical manipulations experienced by the controller device during operation of the controller device in selecting one or more media streams from the menu of media streams for playback by the media device;

selecting, by one or more processors of the machine, a profile identifier from a set of profile identifiers based on a comparison of the accessed controller manipulation data to a controller manipulation profile that corresponds to the profile identifier;

selecting, by one or more processors of the machine, a first subset of the menu of media streams based on the selected profile identifier, the selected first subset indicating media streams to be hidden from view, the first subset having no overlap with a second subset of the menu of media streams; and causing, by one or more processors of the machine, the media device to modify the menu of media streams by omitting the first subset of the menu of media streams from the displayed portion of the menu while displaying the second subset of the menu of media streams in the displayed portion of the menu.

The controller manipulation data may include one or more frequencies at which one or more control elements of the controller device have been activated. Accordingly, a second embodiment provides a method according to the first embodiment, wherein:

the accessed controller manipulation data includes a first activation frequency at which a control element of the controller device was activated during a sequence of activations of the control element;

the controller manipulation profile that corresponds to the profile identifier includes a second activation frequency for the control element; and the comparison of the accessed controller manipulation data to the controller manipulation profile includes a comparison of the first and second activation frequencies.

The controller manipulation data may include one or more patterns in which multiple control elements have been activated. Accordingly, a third embodiment provides a method according to the first embodiment or the second embodiment, wherein:

the accessed controller manipulation data includes a first activation pattern according to which multiple control elements of the controller device were activated during operation of the multiple control elements;

the controller manipulation profile that corresponds to the profile identifier includes a second activation pattern for the multiple control elements; and the comparison of the accessed controller manipulation data to the controller manipulation profile includes a comparison of the first and second activation patterns.

The controller manipulation data may include acceleration data generated by one or more accelerometers as a result of movements by the controller device. Accordingly, a fourth embodiment provides a method according to any of the first through third embodiments, wherein:

the accessed controller manipulation data includes a first sequence of accelerometer data that indicates sequential accelerations experienced by the controller device;

the controller manipulation profile that corresponds to the profile identifier includes a second sequence of accelerometer data; and the comparison of the accessed controller manipulation data to the controller manipulation profile includes a comparison of the first and second sequences of accelerometer data.

In some situations, the acceleration data from such movements indicates whether the controller device was used by a right-handed person or a left-handed person. Accordingly, a fifth embodiment provides a method according to the fourth embodiment, wherein:

the sequential accelerations indicated by the first sequence of accelerometer data correspond to a handedness of a human user in physically manipulating the controller device; and in the compared controller manipulation profile, the second sequence of accelerometer data indicates the handedness.

The controller manipulation data may include orientation data generated by one or more accelerometers as a result of movements by the controller device. Accordingly, a sixth embodiment provides a method according to any of the first through fifth embodiments, wherein:

the accessed controller manipulation data includes a first sequence of accelerometer data that indicates sequential orientations at which the controller device was held;

the controller manipulation profile that corresponds to the profile identifier includes a second sequence of accelerometer data; and the comparison of the accessed controller manipulation data to the controller manipulation profile includes a comparison of the first and second sequences of accelerometer data.

In some situations, the orientation data from such movements indicates whether the controller device was used by a right-handed person or a left-handed person. Accordingly, a seventh embodiment provides a method according to the sixth embodiment, wherein:

the sequential orientations indicated by the first sequence of accelerometer data correspond to a handedness of a human user in physically manipulating the controller device; and in the compared controller manipulation profile, the second sequence of accelerometer data indicates the handedness.

A device detection feature may additionally be implemented. Accordingly, an eighth embodiment provides a method according to any of the first through seventh embodiments, further comprising:

detecting that a user device is within a threshold range of the media device, the user device having a device identifier that corresponds to the profile identifier; and wherein the selecting of the profile identifier from the set of profile identifiers is further based on the user device being detected within the threshold range of the media device.

In some situations, the device detection is performed via a wireless network (e.g., Bluetooth or Wi-Fi). Accordingly, a ninth embodiment provides a method according to the eighth embodiment, wherein:

the detecting that the user device is within the threshold range of the media device includes detecting that the user device has joined a wireless network to which the media device belongs.

According to some implementations, the profile identifier is a basis for selecting, applying, or otherwise using a set of one or more user preferences for a known user of the controller device (e.g., a user who has previously used the controller device and whose explicit or implicit user preferences are stored by the controller device or other machine within the network-based system 105). Accordingly, a tenth embodiment provides a method according to any of the first through ninth embodiments, wherein: the selecting of the first subset of the menu of media streams includes accessing user preferences that correspond to the selected profile identifier and selecting at least part of the first subset based on the accessed user preferences.

In some situations, the set of one or more user preferences specifies that a particular media stream is to be hidden. Accordingly, an eleventh embodiment provides a method according to the tenth embodiment, wherein:

the accessed user preferences that correspond to the selected profile identifier indicate at least one media stream in the first subset of the menu of media streams to be omitted from the modified menu.

In certain situations, the set of one or more user preferences specifies that a particular media stream is to be displayed. Accordingly, a twelfth embodiment provides a method according to the tenth embodiment or the eleventh embodiment, wherein:

the accessed user preferences that correspond to the selected profile identifier indicate at least one media stream in the second subset of the menu of media streams to be maintained in the modified menu.

According to certain implementations, the profile identifier does not correspond to any known user of the controller device (e.g., corresponds to an anonymous user or to a new user). Accordingly, a thirteenth embodiment provides a method according to any of the first through ninth embodiments, wherein:

the profile identifier identifies no user of the controller device and corresponds to an anonymous set of conditions under which the controller device was operated.

According to various implementations, the profile identifier is sufficient to identify a known user of the controller device (e.g., uniquely identifies the user among a set of known users). Accordingly, a fourteenth embodiment provides a method according to any of the first through twelfth embodiments, wherein:

the profile identifier identifies a human user of the controller device.

A fifteenth embodiment provides a machine-readable medium (e.g., a non-transitory machine-readable storage medium) comprising instructions that, when executed by one or more processors of a machine, cause the machine to perform operations comprising:

causing a media device to display at least a portion of a menu of media streams that are selectable for playback by the media device;

accessing controller manipulation data generated by a controller device and indicating a sequence of physical manipulations experienced by the controller device during operation of the controller device in selecting one or more media streams from the menu of media streams for playback by the media device;

selecting a profile identifier from a set of profile identifiers based on a comparison of the accessed controller manipulation data to a controller manipulation profile that corresponds to the profile identifier;

selecting a first subset of the menu of media streams based on the selected profile identifier, the selected first subset indicating media streams to be hidden from view, the first subset having no overlap with a second subset of the menu of media streams; and causing the media device to modify the menu of media streams by omitting the first subset of the menu of media streams from the displayed portion of the menu while displaying the second subset of the menu of media streams in the displayed portion of the menu.

A sixteenth embodiment provides a machine-readable medium according to the fifteenth embodiment, wherein:

the accessed controller manipulation data includes a first activation frequency at which a control element of the controller device was activated during a sequence of activations of the control element;

the controller manipulation profile that corresponds to the profile identifier includes a second activation frequency for the control element; and the comparison of the accessed controller manipulation data to the controller manipulation profile includes a comparison of the first and second activation frequencies.

A seventeenth embodiment provides a machine-readable medium according to the fifteenth embodiment or the sixteenth embodiment, wherein:

the accessed controller manipulation data includes a first sequence of accelerometer data that indicates sequential accelerations experienced by the controller device;

the controller manipulation profile that corresponds to the profile identifier includes a second sequence of accelerometer data; and the comparison of the accessed controller manipulation data to the controller manipulation profile includes a comparison of the first and second sequences of accelerometer data.

An eighteenth embodiment provides a system comprising: one or more processors; and a memory storing instructions that, when executed by at least one processor among the one or more processors, cause the system to perform operations comprising:

causing a media device to display at least a portion of a menu of media streams that are selectable for playback by the media device;

accessing controller manipulation data generated by a controller device and indicating a sequence of physical manipulations experienced by the controller device during operation of the controller device in selecting one or more media streams from the menu of media streams for playback by the media device;

selecting a profile identifier from a set of profile identifiers based on a comparison of the accessed controller manipulation data to a controller manipulation profile that corresponds to the profile identifier;

selecting a first subset of the menu of media streams based on the selected profile identifier, the selected first subset indicating media streams to be hidden from view, the first subset having no overlap with a second subset of the menu of media streams: and causing the media device to modify the menu of media streams by omitting the first subset of the menu of media streams from the displayed portion of the menu while displaying the second subset of the menu of media streams in the displayed portion of the menu.

A nineteenth embodiment provides a system according to the eighteenth embodiment, wherein:

the accessed controller manipulation data includes a first activation frequency at which a control element of the controller device was activated during a sequence of activations of the control element;

the controller manipulation profile that corresponds to the profile identifier includes a second activation frequency for the control element; and the comparison of the accessed controller manipulation data to the controller manipulation profile includes a comparison of the first and second activation frequencies.

A twentieth embodiment provides a system according to the eighteenth embodiment or the nineteenth embodiment, wherein:

the accessed controller manipulation data includes a first sequence of accelerometer data that indicates sequential accelerations experienced by the controller device;

the controller manipulation profile that corresponds to the profile identifier include a second sequence of accelerometer data; and the comparison of the accessed controller manipulation data to the controller manipulation profile includes a comparison of the first and second sequences of accelerometer data.

A twenty-first embodiment provides a carrier medium carrying machine-readable instructions for controlling a machine to carry out the method of any one of the first through fourteenth embodiments.

What is claimed is:

1. A method comprising:

causing, by one or more processors of a machine, a media device to display at least a portion of a menu of media streams that are selectable for playback by the media device;

accessing, by one or more processors of the machine, intentional movement data generated by a remote controller device and indicating a sequence of physical movements experienced by the remote controller device during operation of the remote controller device in selecting one or more media streams from the menu of media streams for playback by the media device;

selecting, by one or more processors of the machine, a first profile identifier from a set of profile identifiers that each correspond to a different intentional movement profile in a set of intentional movement profiles that each indicate a different corresponding user without identifying the corresponding user, the selecting of the first profile identifier being based on a comparison of the accessed remote controller movement data to a first intentional movement profile that corresponds to the first profile identifier;

selecting, by one or more processors of the machine, a first subset of the menu of media streams based on the selected first profile identifier, the selected first subset indicating media streams to be hidden from view, the first subset having no overlap with a second subset of the menu of media streams; and causing, by one or more processors of the machine, the media device to modify the menu of media streams by omitting the first subset of the menu of media streams from the displayed portion of the menu while displaying the second subset of the menu of media streams in the displayed portion of the menu.

2. The method of claim 1, further comprising:

accessing a first activation frequency at which a control element of the remote controller device was activated during a sequence of activations of the control element in selecting one or more media streams; and wherein:

the first intentional movement profile that corresponds to the first profile identifier includes a second activation frequency for the control element; and the comparison of the accessed intentional movement data to the first intentional movement profile includes a comparison of the first and second activation frequencies.

3. The method of claim 1, further comprising:

accessing a first activation pattern according to which multiple control elements of the remote controller device were activated during operation of the multiple control elements in selecting one or more media streams; and wherein:

the first intentional movement profile that corresponds to the first profile identifier includes a second activation pattern for the multiple control elements; and the comparison of the accessed intentional movement data to the first intentional movement profile includes a comparison of the first and second activation patterns.

4. The method of claim 1, wherein:

the accessed intentional movement data includes a first sequence of accelerometer data that indicates sequential accelerations experienced by the remote controller device during intentional operation of the remote controller device in selecting one or more media streams;
the first intentional movement profile that corresponds to the first profile identifier includes a second sequence of accelerometer data; and
the comparison of the accessed intentional movement data to the first intentional movement profile includes a comparison of the first and second sequences of accelerometer data.

5. The method of claim 4, wherein:
the sequential accelerations indicated by the first sequence of accelerometer data correspond to a handedness of a human user in physically manipulating the remote controller device in selecting one or more media streams; and
in the compared first intentional movement profile, the second sequence of accelerometer data indicates the handedness.

6. The method of claim 1, wherein:
the accessed intentional movement data includes a first sequence of accelerometer data that indicates sequential orientations at which the remote controller device was held during intentional operation of the remote controller device in selecting one or more media streams;
the first intentional movement profile that corresponds to the first profile identifier includes a second sequence of accelerometer data; and
the comparison of the accessed intentional movement data to the first intentional movement profile includes a comparison of the first and second sequences of accelerometer data.

7. The method of claim 6, wherein:
the sequential orientations indicated by the first sequence of accelerometer data correspond to a handedness of a human user in physically moving the remote controller device in selecting one or more media streams; and
in the compared first intentional movement profile, the second sequence of accelerometer data indicates the handedness.

8. The method of claim 1, further comprising:
detecting that a user device is within a threshold range of the media device, the user device having a device identifier that corresponds to the first profile identifier; and wherein
the selecting of the first profile identifier from the set of profile identifiers is further based on the user device being detected within the threshold range of the media device.

9. The method of claim 8, wherein:
the detecting that the user device is within the threshold range of the media device includes detecting that the user device has joined a wireless network to which the media device belongs.

10. The method of claim 1, wherein:
the selecting of the first subset of the menu of media streams includes accessing user preferences that correspond to the selected first profile identifier and selecting at least part of the first subset based on the accessed user preferences.

11. The method of claim 10, wherein:
the accessed user preferences that correspond to the selected first profile identifier indicate at least one media stream in the first subset of the menu of media streams to be omitted from the modified menu.

12. The method of claim 10, wherein:
the accessed user preferences that correspond to the selected first profile identifier indicate at least one media stream in the second subset of the menu of media streams to be maintained in the modified menu.

13. The method of claim 1, wherein:
the first profile identifier identifies no user of the remote controller device and corresponds to a first anonymous set of conditions under which the remote controller device was moved during selection of the one or more media streams from the menu of media streams for playback by the media device, the first anonymous set of conditions being distinct among multiple anonymous sets of conditions under which the remote controller device was moved during selection of the one or more media streams from the menu of media streams for playback by the media device.

14. The method of claim 1, wherein:
the first profile identifier is insufficient to identify a human user of the remote controller device.

15. A non-transitory machine-readable storage medium comprising instructions that, when executed by one or more processors of a machine, cause the machine to perform operations comprising:
causing a media device to display at least a portion of a menu of media streams that are selectable for playback by the media device;
accessing intentional movement data generated by a remote controller device and indicating a sequence of physical movements experienced by the remote controller device during operation of the remote controller device in selecting one or more media streams from the menu of media streams for playback by the media device;
selecting a first profile identifier from a set of profile identifiers that each correspond to a different intentional movement profile in a set of intentional movement profiles that each indicate a different corresponding user without identifying the corresponding user, the selecting of the first profile identifier being based on a comparison of the accessed remote controller movement data to a first intentional movement profile that corresponds to the first profile identifier;
selecting a first subset of the menu of media streams based on the selected first profile identifier, the selected first subset indicating media streams to be hidden from view, the first subset having no overlap with a second subset of the menu of media streams; and
causing the media device to modify the menu of media streams by omitting the first subset of the menu of media streams from the displayed portion of the menu while displaying the second subset of the menu of media streams in the displayed portion of the menu.

16. The non-transitory machine-readable storage medium of claim 15, wherein the operations further comprise:
accessing a first activation frequency at which a control element of the remote controller device was activated during a sequence of activations of the control element in selecting one or more media streams; and wherein:
the first intentional movement profile that corresponds to the first profile identifier includes a second activation frequency for the control element; and
the comparison of the accessed intentional movement data to the first intentional movement profile includes a comparison of the first and second activation frequencies.

17. The non-transitory machine-readable storage medium of claim 15, wherein:
the accessed intentional movement data includes a first sequence of accelerometer data that indicates sequential accelerations experienced by the remote controller device during intentional operation of the remote controller device in selecting one or more media streams;
the first intentional movement profile that corresponds to the first profile identifier includes a second sequence of accelerometer data; and
the comparison of the accessed intentional movement data to the first intentional movement profile includes a comparison of the first and second sequences of accelerometer data.

18. A system comprising:
one or more processors; and
a memory storing instructions that, when executed by at least one processor among the one or more processors, cause the system to perform operations comprising:
causing a media device to display at least a portion of a menu of media streams that are selectable for playback by the media device;
accessing intentional movement data generated by a remote controller device and indicating a sequence of physical movements experienced by the remote controller device during operation of the remote controller device in selecting one or more media streams from the menu of media streams for playback by the media device;
selecting a first profile identifier from a set of profile identifiers that each correspond to a different intentional movement profile in a set of intentional movement profiles that each indicate a different corresponding user without identifying the corresponding user, the selecting of the first profile identifier being based on a comparison of the accessed remote controller movement data to a first intentional movement profile that corresponds to the first profile identifier;
selecting a first subset of the menu of media streams based on the selected first profile identifier, the selected first subset indicating media streams to be hidden from view, the first subset having no overlap with a second subset of the menu of media streams; and
causing the media device to modify the menu of media streams by omitting the first subset of the menu of media streams from the displayed portion of the menu while displaying the second subset of the menu of media streams in the displayed portion of the menu.

19. The system of claim 18, wherein the operations further comprise:
accessing a first activation frequency at which a control element of the remote controller device was activated during a sequence of activations of the control element in selecting one or more media streams; and wherein:
the first intentional movement profile that corresponds to the first profile identifier includes a second activation frequency for the control element; and
the comparison of the accessed intentional movement data to the first intentional movement profile includes a comparison of the first and second activation frequencies.

20. The system of claim 18, wherein:
the accessed intentional movement data includes a first sequence of accelerometer data that indicates sequential accelerations experienced by the remote controller device during intentional operation of the remote controller device in selecting one or more media streams;
the first intentional movement profile that corresponds to the first profile identifier includes a second sequence of accelerometer data; and
the comparison of the accessed intentional movement data to the first intentional movement profile includes a comparison of the first and second sequences of accelerometer data.

* * * * *